United States Patent
Chatterjee et al.

(10) Patent No.: US 7,672,945 B1
(45) Date of Patent: Mar. 2, 2010

(54) MECHANISM FOR CREATING MEMBER PRIVATE DATA IN A GLOBAL NAMESPACE

(75) Inventors: Surojit Chatterjee, Foster City, CA (US); Alok K. Srivastava, Newark, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1427 days.

(21) Appl. No.: 10/304,449

(22) Filed: Nov. 25, 2002

Related U.S. Application Data

(60) Provisional application No. 60/370,963, filed on Apr. 8, 2002.

(51) Int. Cl.
*G06F 17/00* (2006.01)
(52) U.S. Cl. .......................................... 707/9
(58) Field of Classification Search ...................... 707/9
See application file for complete search history.

(56) References Cited

U.S. PATENT DOCUMENTS

| | | | |
|---|---|---|---|
| 4,817,091 A | | 3/1989 | Katzman et al. |
| 5,201,000 A | | 4/1993 | Matyas et al. |
| 5,504,892 A | * | 4/1996 | Atsatt et al. ............. 707/103 R |
| 5,758,153 A | * | 5/1998 | Atsatt et al. ............. 707/103 R |
| 5,822,526 A | * | 10/1998 | Waskiewicz ................ 709/206 |
| 5,991,776 A | | 11/1999 | Bennett et al. .............. 707/205 |
| 6,014,646 A | * | 1/2000 | Vallee et al. ................... 705/39 |
| 6,016,499 A | | 1/2000 | Ferguson |
| 6,047,285 A | | 4/2000 | Jacobs et al. |
| 6,061,677 A | | 5/2000 | Blinn et al. |
| 6,067,584 A | | 5/2000 | Hayles et al. |
| 6,073,129 A | | 6/2000 | Levine et al. |

(Continued)

FOREIGN PATENT DOCUMENTS

EP 747867 B1 * 10/1999

OTHER PUBLICATIONS

Geier, European Patent Office, International Preliminary Examination Report for International Application PCT/US 03/09407, Jul. 13, 2004.*

(Continued)

*Primary Examiner*—Khanh B Pham
(74) *Attorney, Agent, or Firm*—Hickman Palermo Truong & Becker LLP; Deborah L. Caswell

(57) ABSTRACT

A system and techniques are described for creating member private data in a global namespace. According to one aspect, first data that is associated with a key is stored in a repository shared by multiple members. After the first data has been stored, second data that is associated with the key is stored without overwriting the first data. Mapping data is stored. The mapping data maps the key, relative to a first member, to a first data structure that stores the first data. The mapping data also maps the key, relative to a second member, to a second data structure that stores the second data. Based on the mapping data, the first member is allowed to access the first data and not the said second data. Based on the mapping data, the second member is allowed to access the second data and not the first data. The first data and the second data may include key values and subtrees of child keys.

22 Claims, 7 Drawing Sheets

U.S. PATENT DOCUMENTS

| | | | |
|---|---|---|---|
| 6,073,140 A * | 6/2000 | Morgan et al. | 707/203 |
| 6,105,025 A | 8/2000 | Jacobs et al. | |
| 6,122,629 A | 9/2000 | Walker et al. | |
| 6,201,948 B1 * | 3/2001 | Cook et al. | 434/350 |
| 6,292,795 B1 | 9/2001 | Peters et al. | 707/3 |
| 6,327,594 B1 * | 12/2001 | Van Huben et al. | 707/200 |
| 6,345,382 B1 * | 2/2002 | Hughes | 717/100 |
| 6,421,662 B1 | 7/2002 | Karten | 707/3 |
| 6,442,748 B1 | 8/2002 | Bowman-Amuah | |
| 6,519,592 B1 | 2/2003 | Getchius et al. | |
| 6,523,041 B1 * | 2/2003 | Morgan et al. | 707/102 |
| 6,748,374 B1 * | 6/2004 | Madan et al. | 707/100 |
| 6,766,327 B2 * | 7/2004 | Morgan et al. | 707/101 |
| 6,826,626 B1 | 11/2004 | McManus | |
| 6,901,401 B2 | 5/2005 | Bangel et al. | |
| 6,915,307 B1 | 7/2005 | Mattis et al. | |
| 6,954,524 B2 * | 10/2005 | Gibson | 715/760 |
| 6,981,257 B2 * | 12/2005 | Teubner | 718/101 |
| 7,103,616 B1 | 9/2006 | Harmer et al. | |
| 7,383,285 B1 * | 6/2008 | Pal et al. | 707/104.1 |
| 2001/0029496 A1 * | 10/2001 | Otto et al. | 705/74 |
| 2001/0034723 A1 * | 10/2001 | Subramaniam | 705/74 |
| 2001/0037316 A1 * | 11/2001 | Shiloh | 705/74 |
| 2001/0044785 A1 * | 11/2001 | Stolfo et al. | 705/74 |
| 2001/0044787 A1 * | 11/2001 | Shwartz et al. | 705/78 |
| 2002/0133537 A1 | 9/2002 | Lau et al. | |
| 2002/0136381 A1 * | 9/2002 | Shaffer et al. | 379/201.02 |
| 2002/0178299 A1 * | 11/2002 | Teubner | 709/320 |
| 2003/0004819 A1 * | 1/2003 | Dutta et al. | 705/26 |
| 2003/0013951 A1 * | 1/2003 | Stefanescu et al. | 600/407 |
| 2003/0088656 A1 * | 5/2003 | Wahl et al. | 709/223 |
| 2003/0115126 A1 * | 6/2003 | Pitroda | 705/36 |
| 2003/0191739 A1 | 10/2003 | Chatterjee et al. | |
| 2004/0172397 A1 | 9/2004 | Asherman | |
| 2004/0210582 A1 * | 10/2004 | Chatterjee et al. | 707/9 |
| 2005/0038773 A1 | 2/2005 | Gray et al. | |
| 2005/0091543 A1 * | 4/2005 | Holtzman et al. | 713/202 |
| 2005/0114453 A1 * | 5/2005 | Hardt | 709/206 |
| 2006/0195450 A1 | 8/2006 | Chatterjee et al. | |
| 2008/0010284 A1 | 1/2008 | Beck | |

OTHER PUBLICATIONS

Camensich et al., Esorics 1994: Proceedings of the 3rd European Symposium on Research in Computer Security, "An Efficient Electronic Payment System Protecting Privacy", Nov. 1994, (Abstract Only), Springer-Verlag, Lecture Notes in Computer Science, No. 875.*

Davida, "Anonymity Control in E-Cash Systems", In Proceedings of the First international Conference on Financial Cryptography (Feb. 24-28, 1997). R. Hirschfeld, Ed. Lecture Notes In Computer Science, vol. 1318. Springer-Verlag, London, 1-16.*

Froomkin, "The Collision of Trademarks, Domain names, and due Process in Cyberspace", Feb. 2002, Communications of the ACM, ACM Press, vol. 44, No. 2, p. 91-97.*

IBM Technical Disclosure Bulletin, "Method for Adding Personalities to Distributed Computing Environment Registry", May 1996, p. 93-98 (repaginated 1-5).*

Braumandl et al, "ObjectGlobe: Ubiquitous query processing on the Internet", Jun. 7, 2001, The VLDM Journal, vol. 10, Springer-Verlag, p. 48-71.*

Donahue, "Single Sign-on and Identity Management", Dec. 2002, Microsoft Corp., p. 1-5.*

HP, "The Gold Standard: Cluster File System in hp TruCluster Server", Oct. 2002, p. 1-18.*

Compaq Computer Corporation, UNIX Software Division, "Cluster File System in Compaq *TruCluster* Server: Extending the advantages of single-system file systems to high availability clusters," Sep. 2001, pp. 1-13.

Jim Gray et al., "Transaction Processing: Concepts and Techniques," 1993, pp. 556-558.

Werner Vogels et al., "The Design and Architecture of the Microsoft Cluster Service, A Practical Approach to High-Availability and Scalability," May 1997, Cornell University Dept. of CS Technical Report, number assignment in preparation, 10 pages.

Werner Vogels et al., "Scalability of the Microsoft Cluster Service," undated, 9 pages.

Gregory F. Pfister, "Second Edition, In Search of Clusters, The Ongoing Battle in Lowly Parallel Computing," 1995, Chapter 4, pp. 71-84.

Murthy Devarakonda et al., "Recovery in the Calypso File System," ACM Transactions on Computer Systems, vol. 14, No. 3, Aug. 1996, pp. 287-310.

Marshall Kirk McKusick et al., "A Fast File System for UNIX*," Revised Feb. 18, 1984, pp. 1-14.

Mendel Rosenblum et al., "The Design and Implementation of a Log-Structured File System," Jul. 24, 1991, pp. 1-15.

Gregory R. Ganger et al., "Embedded Inodes and Explicit Grouping: Exploiting Disk Bandwidth for Small Files," First appeared in the Proceedings of the USENIX Technical Conference, Jan. 1997, pp. 1-17.

Keith Smith et al., "File Layout and File System Performance," TR-35-94, undated, pp. 1-23.

Tatu Ylönen, "Shadow Paging Is Feasible," undated, pp. 1-15.

Tatu Ylönen, "Write Optimizations and Clustering in Concurrent Shadow Paging," undated, pp. 1-16.

Tatu Ylönen, "Concurrent Shadow Paging: A New Direction for Database Research," undated, pp. 1-7.

Hewlett-Packard Company, "The Gold Standard: Cluster File System in hp *TruCluster* Server, Extending the advantages of single-system file systems to high availability clusters," Oct. 2002, pp. 1-16.

Tim Read et al., "Robust Clustering: A Comparison of Sun™ Cluster 3.0 versus Sun Cluster 2.2 Software," Sun BluePrints™OnLine-Sep. 2001, pp. 1-23.

Microsoft Corporation, "Microsoft® Windows2000 Advanced Server, Windows 2000 Clustering Technologies: Cluster Service Architecture," 2000, 27 pages.

Sun® Microsystems, Inc., "The Sun Enterprise Cluster Architecture, Technical White Paper," 1997, pp. 1-74.

International Preliminary Examining Authority, "Notification of Transmittal of the International Preliminary Examination Report," Jul. 13, 2004, 18 pages.

Current claims in PCT application, International Application No. PCT/US03/09407, 10 pages.

Oracle Corporation, "Oracle 8i, Administrator's Guide," Release 2 (8.1.6), Dec. 1999, Part No. A76956-01, Chapter 16, 14 pages.

European Patent Office, "International Search Report," application No. 03716862.2—1527, dated Jun. 8, 2005, 7 pages.

India, "First Examination Report", Application No. 01528/KOL NP/04, Received Mar. 19, 2008, 7 pages.

Claims, Application No. 01528/KOL NP/04, 10 pages.

U.S. Appl. No. 11/404,159, filed Apr. 13, 2006, Notice of Allowance, Mailing Date Jun. 25, 2009.

Hjaltason, Gisli R. et al., "Speeding up bulk-loading of quadtrees," 1997, ACM Press, NY, NY, pp. 50-53.

Ratnasamy, Sylvia et al., "A scalable content addressable network," 2001, ACM Press, NY, NY, pp. 161-172.

* cited by examiner

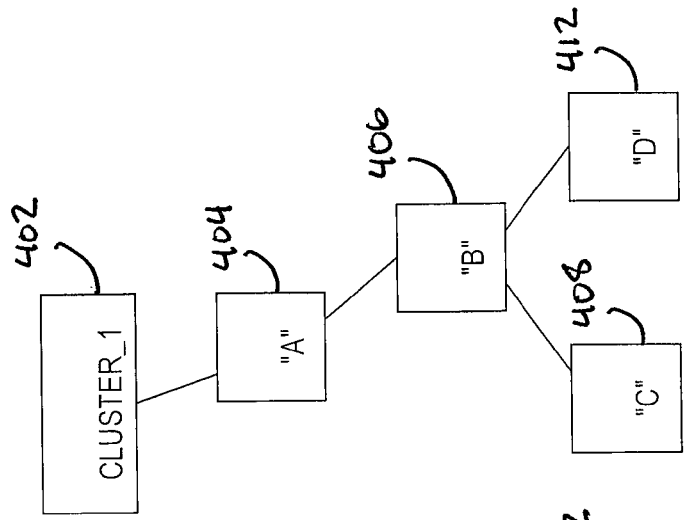
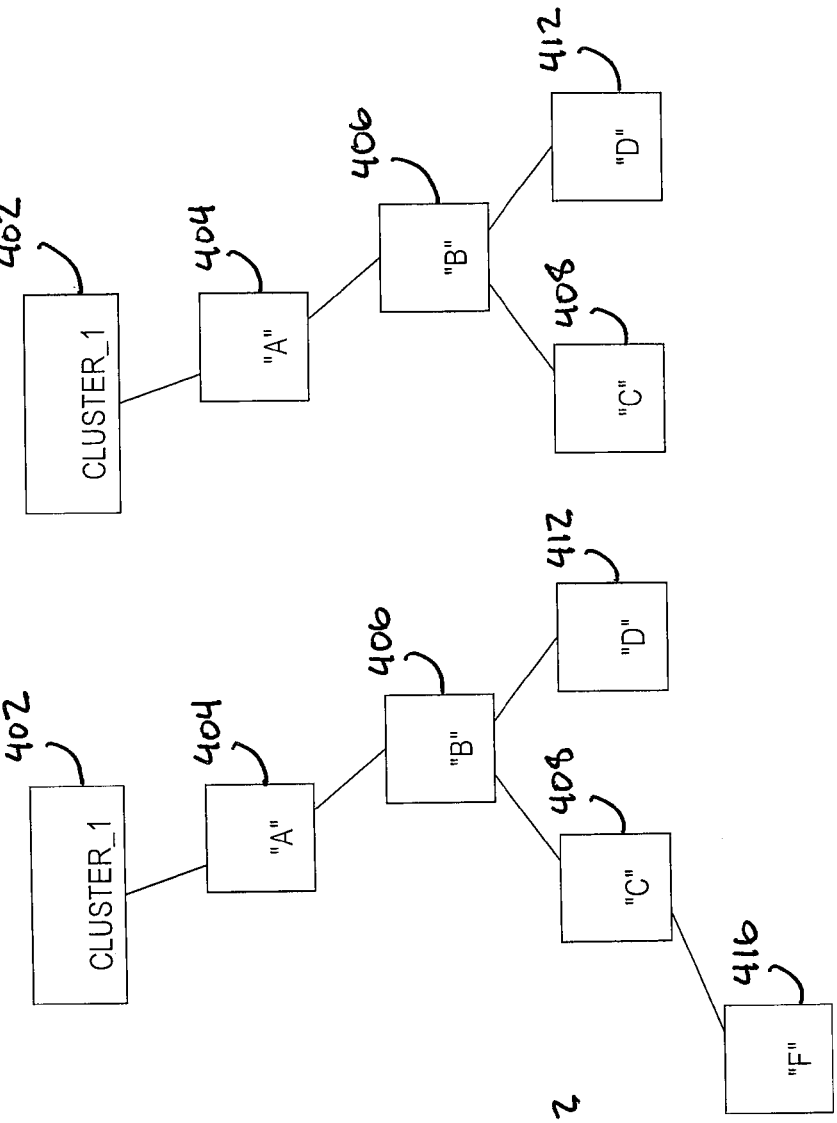
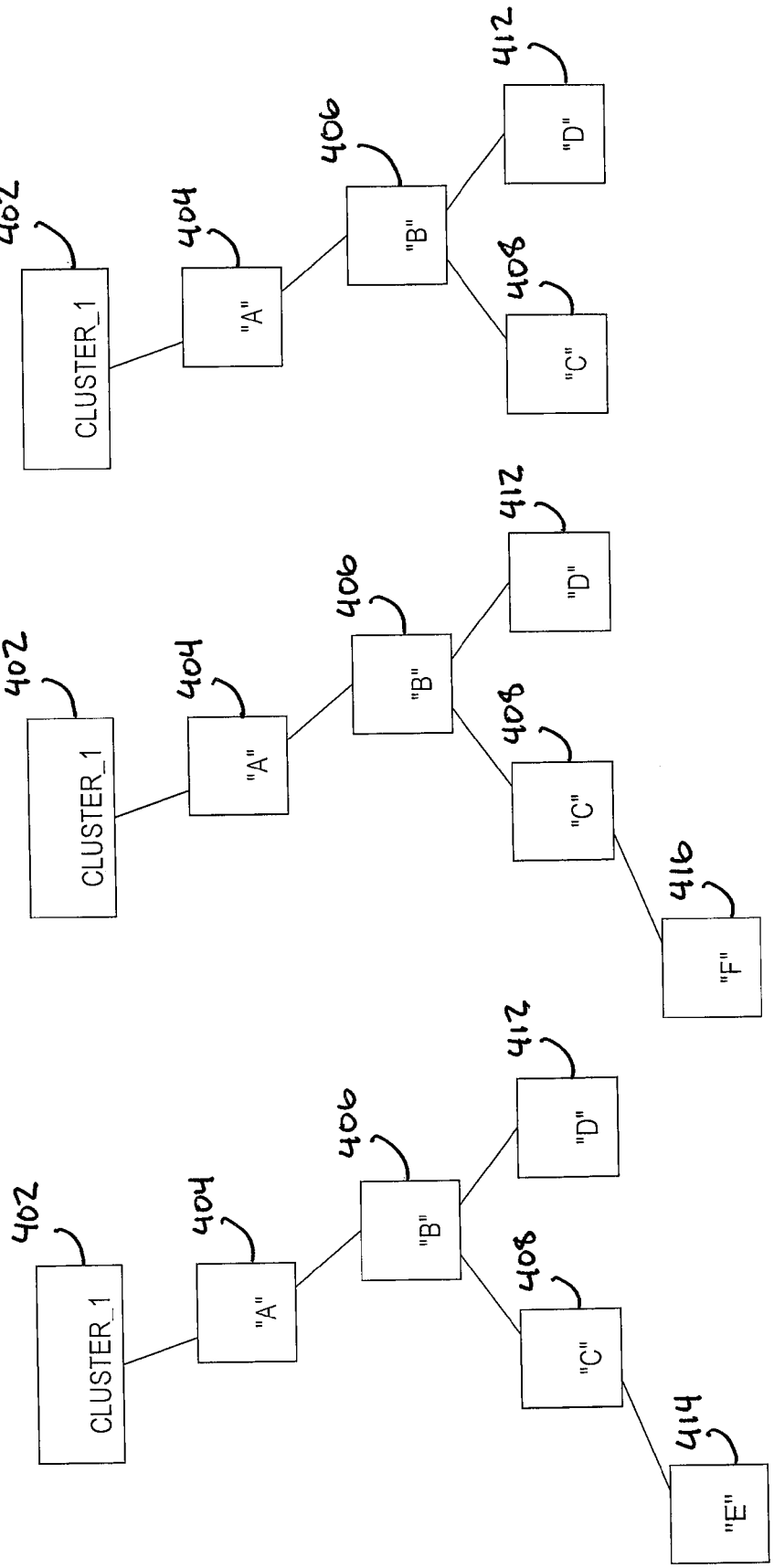
FIG. 4A
FIG. 4B
FIG. 4C

MECHANISM FOR CREATING MEMBER PRIVATE DATA IN A GLOBAL NAMESPACE

RELATED APPLICATIONS

The present application claims priority to the following provisional U.S. Patent Applications:

U.S. Provisional Patent Application No. 60/370,963 entitled "Personalized Content Within a Global Namespace", filed Apr. 8, 2002, which application is incorporated by reference herein; and U.S. Provisional Patent Application No. 60/372,186 entitled "Approach for Personalized Content Within a Global Namespace", filed Apr. 12, 2002.

The present application is also related to the following non-provisional U.S. Patent Applications, the entire contents of which are incorporated herein for all purposes:

U.S. patent application Ser. No. 10/232,907 entitled "Use of Dynamic Hash Tree for Managing Hierarchically Structured Information" filed on Aug. 30, 2002 by Surojit Chatterjee and Sameer Joshi;

U.S. patent application Ser. No. 10/253,088 entitled "Persistent Key-Value Repository with a Pluggable Architecture to Abstract Physical Storage" filed on Sep. 23, 2002 by Surojit Chatterjee, Raj Kumar, Jonathan Creighton, Alok K. Srivastava, and Sameer Joshi.

FIELD OF THE INVENTION

The present invention relates to data storage and, more specifically, to storing hierarchical data on a persistent storage device.

BACKGROUND OF THE INVENTION

Hierarchical Data Model

A data model provides the general structure of a database. A data model can be viewed as a collection of conceptual tools for describing data, data relationships, data semantics, and consistency constraints.

It is often useful to model data in a hierarchical structure. In a hierarchical model, data and relationships among data are represented by records and links, respectively. Hierarchically modeled data is logically structured as a "tree", which includes a conglomeration of parent-child relationships between data within the hierarchical structure. LDAP (Lightweight Directory Access Protocol), Microsoft® Windows® registry hierarchical structure, and Oracle® Cluster Registry hierarchical structure are examples of uses of hierarchically modeled or structured information.

FIG. 1 is a diagram graphically illustrating hierarchically structured, or related, data. Structuring data hierarchically provides some benefits over other data structures. It is easier to explore hierarchically structured data than other data structures, due to the inherent semantic benefits of the hierarchical structure. For example, one can intuitively traverse a hierarchy to locate a specific data item of interest.

Hierarchically organized data is generally represented by a key name-value (or name-value) pair. More specifically, each item of information is identified within the hierarchy by a key name consisting of key components. The term "key name" is generally used herein to refer to a specific value within the key domain associated with the hierarchy. For example, a key domain may be network IP addresses and an associated key name may be 255.255.000.000. For another example, a domain may be the collection of URLs associated with the public Internet, and an associated key of the domain may be a specific URL associated with a specific web page.

For example, a file's location in a hierarchical directory may be identified as: C:\My Documents\example.doc, wherein each backslash separates levels of the associated hierarchy. More generally, information may be identified by a key name represented as a character string, such as a.b.d.e, where key component e is a child (i.e., a descendant) of key component d, key component d is a child of key component b, and so on, to the hierarchy root. In some contexts, hierarchically organized information contains name-value pairs. A value is information associated with a name. For example, in the foregoing hierarchical directory path, "My Documents\example.doc" is a name of a name-value pair. The content of this file is the value of the name-value pair.

FIG. 1 illustrates that a hierarchical structure has levels associated with the structure, and thus, the key name. That is, each key name has as many levels as the number of key components in the key name. For example, items x and a are one level from the root, so they are considered at Level 1; items z, c, and d are three levels from the root and are considered at Level 3.

Example System that Uses Hierarchical Data

A distributed system may include multiple logical computational units. Each logical computational unit may be referred to as a "member" of the distributed system. Thus, a member may be a network-connected personal computer, workstation, central processing unit (CPU), or other logical computational unit such as an instance of a program. Members of a distributed system can communicate with each other.

Multiple members of a distributed system may share a common entity. One such shared entity is a shared file system. All of the members in the distributed system may directly access the shared file system (e.g., through a network). All of the members in the distributed system can see a given file within the shared file system. All of the members within the distributed system may access the contents of the given file. In other words, the data that is contained in the file is "public" or "global" to all members and not "private" to any particular member.

It is common for one member of a distributed system to be one instance of a particular computer program, and for another member of the distributed system to be another instance of the same computer program. Each member of a distributed system may be a different instance of the computer program. Each instance may be able to communicate with each other instance. The particular computer program may be, for example, a database server. The particular computer program may execute, for example, in the form of multiple concurrent processes.

All instances of the particular computer program may attempt to read or write to a same particular file (such as a configuration file) in the shared file system. The particular computer program might not have been designed to operate in a shared file system. Therefore, by overwriting a value in the particular file, one instance of the particular program may cause the other instance of the computer program to subsequently read an incorrect value. Such data conflicts constitute a problem.

This problem particularly impacts registries. A registry is a data repository that stores configuration information. A single registry may store configuration information for multiple databases that are stored on a single shared storage subsystem. A registry may organize data according to the hierarchical data model described above. Configuration information for multiple databases may be hierarchically organized beneath a single root.

One example of a multi-instance database server is RAC, which can have multiple instances of the same program running as multiple members of a distributed system. To communicate with each other, each of these instances listen to specific ports for communicating with each other. For example, a key like "RAC.instancename" could be created in a shared (between all the instances of RAC) configuration repository such as a registry. Each instance of RAC stores its name as a value of the key "RAC.instancename". Consequently, every time, after the first time, that an instance of RAC stores its name as a value of this key, the previous value of this key will be overwritten. This results in a data conflict.

Many applications require that the multiple members of a distributed system (such as instances of the same computer program) refer to a piece of data in the global repository by the same name but read or write a value that is specific for each instance.

Computer programs, such as database servers, may be modified to access separate instances of files (or registry entries) in a shared file system (or registry). However, such modification is impossible when source code is unavailable. Even when source code is available, source code modification is time-consuming and expensive. Often times it is not desirable.

BRIEF DESCRIPTION OF THE DRAWINGS

The present invention is illustrated by way of example, and not by way of limitation, in the figures of the accompanying drawings and in which like reference numerals refer to similar elements and in which:

FIGS. 4A, 4B, and 4C are block diagrams that illustrate member-dependent data sub-hierarchies, according to one embodiment;

DETAILED DESCRIPTION OF THE INVENTION

Figure 1:
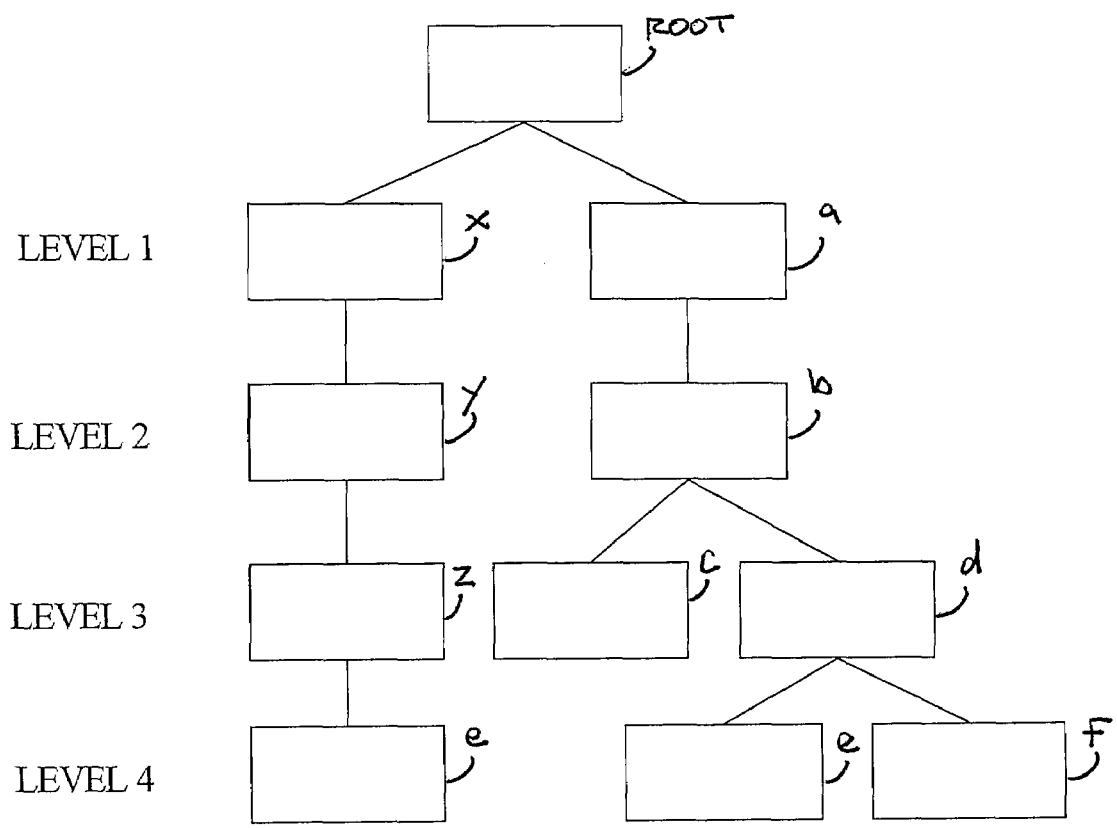
FIG. 1 is a diagram graphically illustrating hierarchically structured, or related, data.

A method and system for creating member private data in a global namespace is described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Functional Overview

Techniques are disclosed for creating member private data in a global namespace. First data that is associated with a key is stored in a repository that is shared by multiple members of a distributed system. After the first data has been stored, second data that is associated with the key is stored without overwriting the first data. Mapping data is stored. The mapping data maps the key, relative to a first member of the distributed system, to a first data structure that stores the first data. The mapping data also maps the key, relative to a second member of the distributed system, to a second data structure that stores the second data. Based on the mapping data, the first member is allowed to access the first data and not the second data. Based on the mapping data, the second member is allowed to access the second data and not the first data. The first data and the second data may include key values and subtrees of child keys. While reference is made above to first and second members, the techniques disclosed herein may be applied to a greater number of members.

Multiple members may access a particular key that is contained in the mapping. Through the mapping, data (which may include, for example, a single value or an entire subtree of name-value pairs) that is obtained by a member as a result of accessing the key is dependent upon which member accessed the particular key. In other words, multiple members may share a global namespace while maintaining their member private data.

As a result, two different instances of a same computer program, which are running as two different members of a distributed system, and which are designed to read and update values associated with a same key, need not be modified to avoid data conflicts. One instance may refer to the key and obtain a first value that is associated with that instance, and another instance may refer to the same key and obtain a second value that is associated with that other instance. Similarly, one instance may update a first value that is associated with the key, while a second value, that is associated with the same key and with another instance, remains unaffected. Similarly, given multiple instances where each instance is running as a different member of a distributed system, each instance may update a value that is associated with a key, while other values, that are associated with the same key and with other instances, remain unaffected.

While reference is made herein to a single key referencing different single values, the techniques described herein may also be applied to a single key referencing different structures that each include multiple values. For example, the techniques described herein may be applied to produce a single key that references two different hierarchies, or subtrees, of key-value pairs. Thus, according to one embodiment, a whole subtree of key-value pairs may be made private to a given member.

Additionally, structures are disclosed for efficiently storing and accessing key-value pairs that implement public keys and private data as described above. Such efficient structures may be established on a persistent storage device. These structures are described below, first generally, and then with reference to the specific manner in which these structures implement private member data in a global namespace. The structures described below are described for the sake of context, and are not intended to represent an exclusive means of implementing the mapping described above.

The Registry Pages

According to one embodiment, a storage device may have stored thereon several "registry pages." A registry page is a defined data storage space on a data storage device. Each registry page is of some specified size. For example, each registry page may be 4 kilobytes long.

Taken together, multiple registry pages form a tree structure comprised of nodes. Nodes in the tree structure are data structures that are referred to herein as "tree nodes" or "t-nodes." Each of the registry pages stores a t-node. However, t-nodes need not be stored contiguously. Each t-node corresponds to a key in a hierarchy of keys (which has the same organization as the tree structure). A first of the registry pages is a root t-node of the tree structure.

Example Tree Structure

Figure 2A:
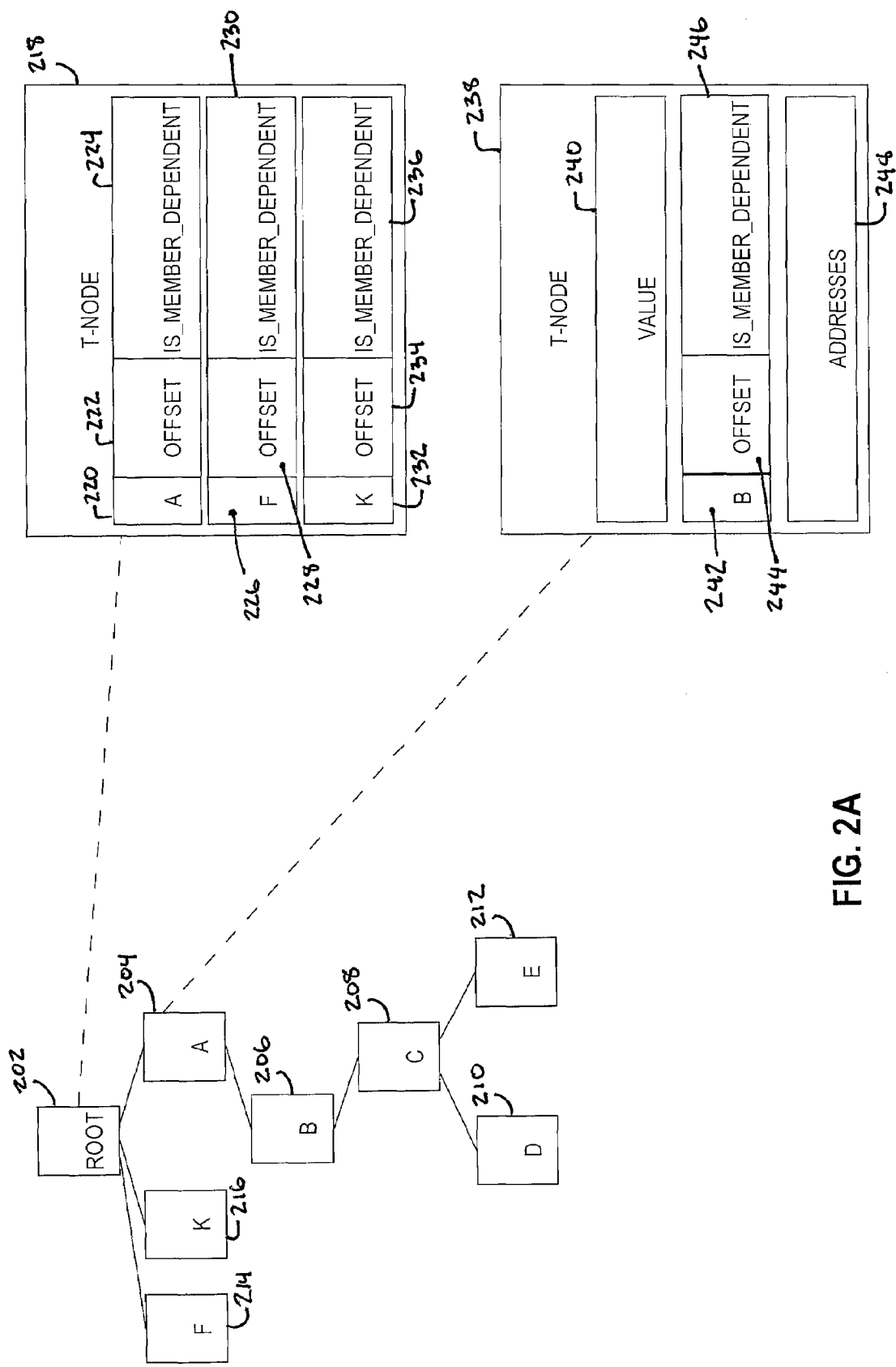
FIG. 2A is a block diagram that shows an example of a hierarchical data structure with associated t-nodes, according to one embodiment.

FIG. 2A is a block diagram that shows an example of a hierarchical data structure with associated t-nodes, according to one embodiment. The hierarchical data structure is a tree of keys. Keys may be parents of, and children of, other keys. For example, key "A" 204 is referred to as a parent key of key "B" 206. Likewise, key "B" 206 is referred to as a child key of key "A" 204.

Each key may be associated with a value. For example, key "A" 204 may be associated with a value "1". Key "B" 206 may be associated with a value "2". Key "C" 208 may be associated with a value "3". Key "D" 210 may be associated with a value "4". Key "E" 212 may be associated with a value "5".

The tree includes a root key 202. Root key 202 may be invisible to the users of the distributed system. In other words, root key 202 is hidden and is not made visible to the users of the distributed system. In this example, root key 202 is a parent key of key "A" 204, key "F" 214, and key "K" 216. When a particular key is created without an explicit designation of a parent key of the particular key, the parent key of the particular key is implicitly designated to be the root key.

The T-Nodes

Each key is associated with a t-node. Each t-node is located at a particular location (i.e., offset) on a storage device. The location of a t-node that is associated with a particular key is stored in a t-node that is associated with a parent key of the particular key.

In this example, root key 202 is associated with a t-node 218. T-node 218 includes information for each t-node that is associated with a child key of root key 202. Because root key 202 is the parent key of key "A" 204, key "F" 214, and key "K" 216, t-node 202 includes information for t-nodes associated with each of key "A" 204, key "F" 214, and key "K" 216. Information for a t-node associated with a particular key is called a "key component entry" for the particular key.

According to one embodiment, each dot-separated name inside a full key path name is called a key component. For each key component there is a corresponding key component entry. Key component entries are variable in size to take into account widely different size of key names. In one embodiment, up to 255 characters are allowed for each key component, and up to 255 bytes are reserved for each key component name. In one embodiment, a key component name is one or more characters. A key component entry includes a name of the key component and, in one embodiment, a 5 byte logical address of a registry page that stores a t-node that is associated with the key. Of these 5 bytes, the first byte may be used to indicate whether the key is a member-dependent key. Member-dependent keys are described below in the section entitled, "MEMBER-DEPENDENT KEYS". If the key is a member-dependent key, then a logical-to-physical address mapping may be obtained from a "member-dependent key map", which is described in greater detail below in the section entitled, "THE MEMBER-DEPENDENT KEY MAP". The logical address obtained may be a number that is used as an index in the member-dependent key map.

A key component entry for key "A" 204 includes a key component name ("A") 220, an offset 222, and other fields. These other fields include a field is_member_dependent 224. Similarly, a key component entry for key "F" 214 includes a key component name ("F") 226, an offset 228, and other fields, including a field is_member_dependent 230. Likewise, a key component entry for key "K" 216 includes a key component name ("K") 232, an offset 234, and other fields, including a field is_member_dependent 236. The purpose of the is_member_dependent field is described in greater detail in the section below entitled "MEMBER-DEPENDENT KEYS."

Offset 222 provides the location, on a storage device, of a t-node that is associated with key "A" 204. Similarly, offset 228 provides the location, on the storage device, of a t-node that is associated with key "F" 214. Likewise, offset 234 provides the location, on the storage device, of a t-node that is associated with key "K" 216.

Therefore, offset 222 provides the location of a t-node 238 that is associated with key "A" 204. Each t-node includes the value of the key that corresponds to that t-node. Thus, both data (e.g., value) and metadata (e.g., key name) are encapsulated within the same t-node data structure. T-node 238 includes a value 240 that is the value of key "A" 204. In this example, value 240 is "1". In one embodiment, 256 bytes of a t-node are reserved for the value. In one embodiment, values larger than 256 bytes are not stored within the t-node; instead, such larger values are stored at a location to which the t-node points. A technique for storing larger values using indirection is described in greater detail in the section below entitled "USING INDIRECTION TO STORE VALUES AND KEY COMPONENT ENTRIES."

Like each t-node, t-node 238 includes key component entries for each child key of the key with which t-node 238 is associated. Therefore, t-node 238 includes a key component entry for key "B" 206. This key component entry includes a key component name ("B") 242, an offset 244, and other fields, including a field is_member_dependent 246. Offset 244 provides the location, on the storage device, of a t-node (not shown) that is associated with key "B" 206.

Each t-node may also include version information, an owner identifier, a group identifier, access control information (e.g., for users, groups, and others), a number of links to the t-node (e.g., from other t-nodes), a data type of the value of the key that corresponds to the t-node, a size of the value, a number of child keys of the key, a member number, a time that the t-node was created, a time that the t-node was last modified. The key name of the key does not need to be included in the t-node because the key name may be included in the parent t-node of the t-node. This reduces redundancy and preserves storage resources.

In one embodiment, a t-node layout is organized as follows. The first 4 bytes have registry version information. The next 4 bytes are reserved for an owner identifier. The next 4 bytes are reserved for a group identifier. The next 3 bytes are used for access control information for users, groups, and others. The next 1 byte is used to hold the count of the number of links on the current t-node. Therefore, in one embodiment, the maximum number of links is 255. One byte is reserved to indicate whether the t-node is a member-dependent key. One byte is reserved for a data type of the value of the key that is associated with the t-node. The next 4 bytes are reserved for the size of the value data. The next 4 bytes are reserved for creation time information. The next 4 bytes are reserved for last modification time information. The next 4 bytes are used to hold the number of child keys, or key component entries, of the key that is associated with the t-node. In one embodiment approximately 64,000 child keys may be under each key. The next 256 bytes are used to store the value of the key that is associated with the t-node. As described below, larger values may be stored through indirection. The next 80 (4*20) bytes contain logical addresses of 20 pages (described below) that accommodate up to 80 kilobytes of data through single indirection (described below). The next 4 bytes contain an address of a page that contains double indirect pages (described below) for value data, thus accommodating an additional gigabyte of data. The next 12 bytes, starting at byte offset 378, contain addresses of three pages that contain double indirect addresses (described below) of pages that contain key component entries. The next 100 bytes, beginning at byte offset 390, contain addresses of 25 pages that contain key component entries. The next 110 bytes are reserved for other uses. The rest of the space in the t-node is taken up by key component entries. Each key component entry represents one child key.

Using Indirection to Store Values and Key Component Entries

In one embodiment, a t-node is allocated to contain within itself, at most, a 256 byte value. It may sometimes be desirable to associate, with a key, a value that is larger than 256 bytes (or whatever limited amount of data storage space has been specified).

Therefore, in one embodiment, a t-node may include one or more addresses. For example, t-node 238 includes addresses 248. Each address may provide the location, on the storage device, of a different page. In one embodiment, each page is a different 4 kilobyte data storage space. Such pages are different than the registry pages discussed above.

The first 256 bytes of a value are stored in the t-node itself. The remainder of the value may be divided into 4 kilobyte portions. Each portion may be stored in a different page. The addresses included in the t-node provide the locations of the pages, which need not be contiguous. So, for example, the first 4 kilobytes after the first 256 bytes of a value may be stored in a first page that is referenced by a first address, the next 4 kilobytes after that may be stored in a second page that is referenced by a second address, and the remainder of the value (which may be less than 4 kilobytes) may be stored in a third page that is referenced by a third address. Because each address refers directly to the location of a page, this technique is called "single indirection."

Because each t-node is limited to some size, a finite number of addresses may be stored in a t-node. In one embodiment, each address is 32 bytes long. Therefore, to store even larger values, each 4 kilobyte page referred to by one of addresses 248 may include one or more other addresses (a 4 kilobyte page may include up to 128 32-byte addresses). Each of these other addresses may, in turn, refer to a different 4 kilobyte page. Each of these different pages may store a different portion of the value. Because each address in the t-node refers to a page that includes addresses that refer to yet other pages, this technique is called "double indirection."

In other embodiments, additional levels of indirection may be used. Consequently, the specified size of a t-node imposes no limit on the size of a value that may be associated with a key.

Indirection may also be used to allow a parent key to have a greater number of child keys. As described above, a t-node contains key component entries for each child key of the key that is associated with the t-node. Because the size of a t-node is limited, a finite number of key component entries may be contained within a given t-node. In one embodiment, addresses contained in the t-node may refer to different pages that store key component entries in addition to those that are stored in the t-node itself. Any level of indirection is possible. Consequently, the specified size of a t-node imposes no limit on the number of keys that may be children of a particular key.

Using a Slotted Page Structure to Store Key Component Entries

Figure 2B:
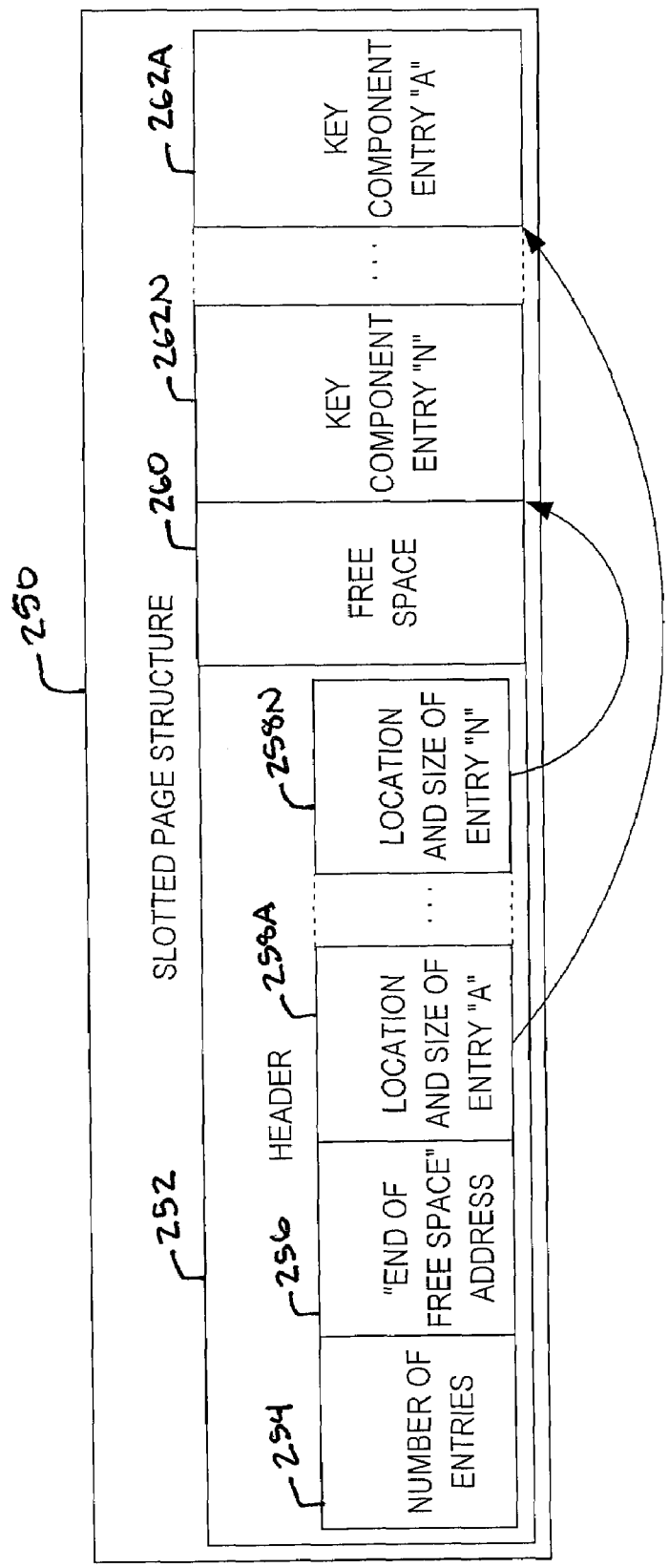
FIG. 2B is a block diagram that illustrates a slotted page structure that may be used to store key component entries, according to one embodiment.

FIG. 2B is a block diagram that illustrates a slotted page structure that may be used to store key component entries, according to one embodiment. In one embodiment, each t-node stores key component entries for the child keys of the key that is associated with that t-node in a slotted page structure that is contained within that t-node. The slotted page structure itself is a data structure that is well known.

Slotted page structure 250 includes a header 252, free space 260, and key component entries 262A-262N. Header 252 includes a number of entries 254. Number of entries 254 contains the number of key component entries that are stored in slotted page structure 250.

Header 252 also includes an "end of free space" address 256. "End of free space" address 256 contains the address at the end of free space 260. It is at this address that new key component entries are added to slotted page structure 260. In one embodiment, "end of free space" address 256 is a two-byte address. In one embodiment, header 252 is located starting at byte offset 600 of a t-node.

Header 252 also includes an array 258A-258N that stores locations and sizes of each of the key component entries 262A-262N that are stored in slotted page structure 250. In array 258A-258N, the location and size of key component entry "A" 262 is indicated by location and size of entry "A" 258A. Likewise, the location and size of key component entry "N" 262N is indicated by location and size entry "N" 258N. Other locations and sizes of other key component entries may similarly by indicated in array 258A-258N.

Located between header 252 and key component entries 262A-262N is free space 260. Free space 260 is a contiguous space that shrinks as key component entries are added to the t-node and grows as key component entries are removed from the t-node.

Key component entries 262A-262N are the key component entries for the child keys of the key that is associated with the t-node. Key component entries are added starting at the end of the slotted page structure, and then towards the start of free space 260 with each new addition.

In one embodiment, when a key component entry is removed from slotted page structure 250, the key component entries closest to free space 260 are relocated so that the space formerly occupied by the removed key component entry is occupied. This relocation essentially "de-fragments" the key component entries, thus ensuring the contiguity of both free space 260 and key component entries 262A-262N.

Member-Dependent Keys

Data may be made private to a particular member of a distributed system through the creation of a member-dependent key. A member-dependent key is expressly designated as being member-dependent when it is created. A member-dependent key may be created from any member of a distributed system; even a member other than the particular member for whom the data associated with the member-dependent key will be private.

Member-dependent keys are different from keys that are not member-dependent, in that member-dependent keys are expressly designated to be member-dependent keys when they are created. Invoking a special function of an Application Programming Interface (API) causes a member-dependent key to be created. Child keys of a member-dependent key do not need to be expressly designated as member-dependent keys in order to be private to a particular member. When a child key (or grandchild key, great-grandchild key, etc.) of a member-dependent key is created, that child key is automatically made private to the member that created it. This is so even though the member does not expressly designate that child key as a member-dependent key.

In one embodiment, a key component entry for a key includes information that designates that key as being a "member-dependent key." For example, if key "B" 206 was created as a member-dependent key, then the field is_member_dependent 246 would be set to "true" (e.g., "1"). Otherwise, is_member_dependent 246 would be set to "false" (e.g., "0").

A key that is designated as being a member-dependent key may reference different values for different members of the distributed system. In other words, the value of a member-dependent key depends on the member from which the key is accessed. In one embodiment, a key component entry for a member-dependent key includes, instead of an offset that provides a location of a t-node, an index value for an entry in a data structure. The data structure that contains the entry is called the "member-dependent key map." The member-dependent key map is described in greater detail below.

The Member-Dependent Key Map

Figure 3:
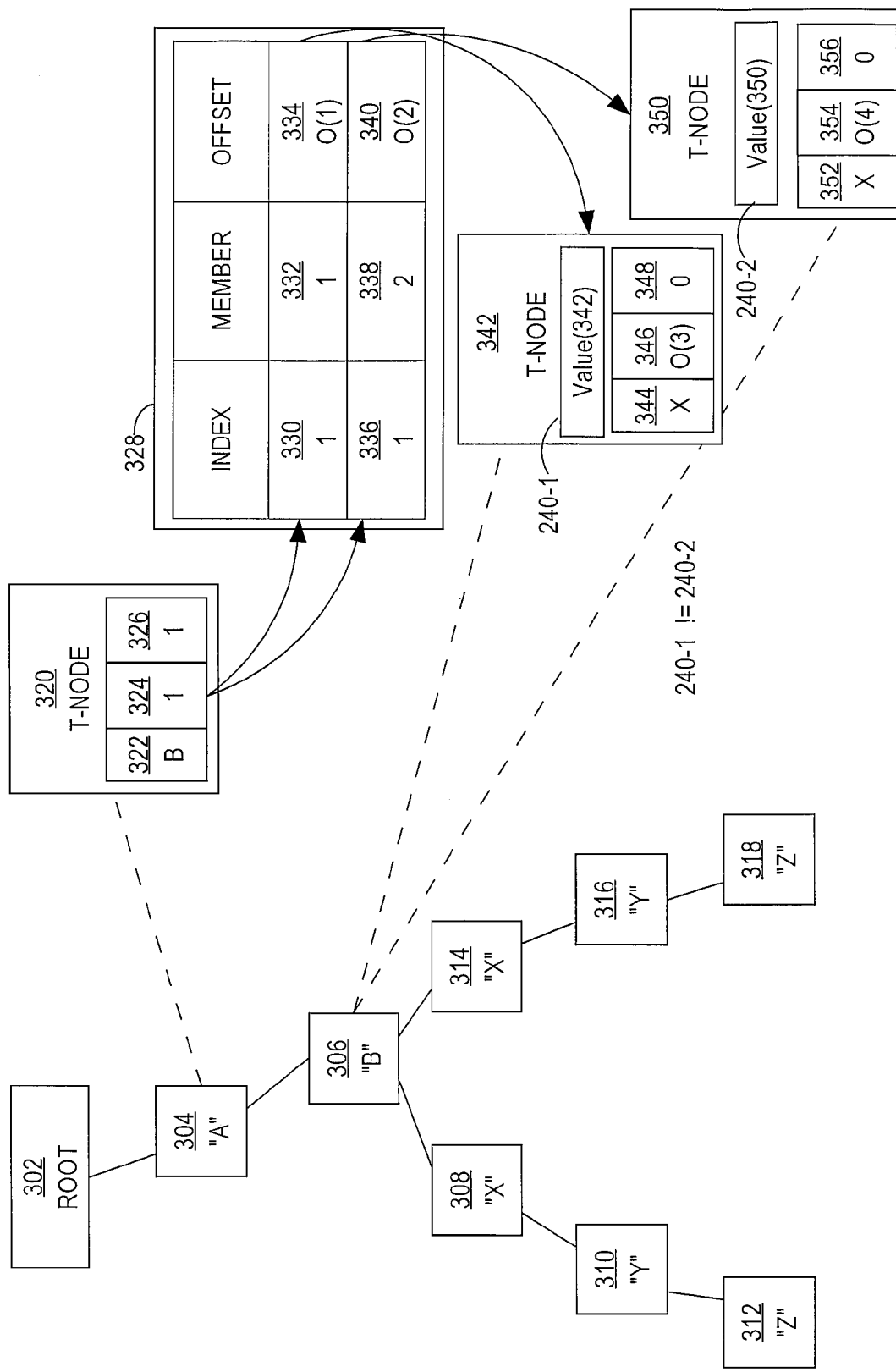
FIG. 3 is a block diagram that illustrates a member-dependent key map, according to one embodiment.

FIG. 3 is a block diagram that illustrates a member-dependent key map, according to one embodiment. In one embodiment, the member-dependent key map is a table 328. Each entry (e.g., row) of the table includes an index value, a member identifier, and an offset that provides a location of a t-node on the physical storage device. For example, one row of table 328 includes an index value 330, a member identifier 332, and an offset 334. Another row of table 336 includes an index value 336, a member identifier 338, and an offset 340. The index value may also be referred to as a "member dependent key number" or "MDK number". Each offset may be a physical page number.

To illustrate the function of table 328, an example hierarchy of keys is also shown. In the example hierarchy, root key 302 is the parent key of key "A" 304. Key "A" is the parent key of key "B" 306. In this example, key "B" 306 has been created as a member-dependent key. As a member dependent-key, key "B" 306 may reference one value relative to one member, and another different value relative to another member.

Also, as a member-dependent key, key "B" 306 is the parent key of both key "X" 308 and key "X" 314. While key "X" 308 and key "X" 314 share a global name space (by virtue of the shared key component name "X"), the value and child keys of key "X" 308 are private to one member, while the value and child keys of key "X" 314 are private to another member.

Key "X" 308 is the parent key of key "Y" 310. Key "Y" is the parent key of key "Z" 312. Key "Y" 310 and key "Z" 312 are private to the same member to which key "X" 308 is private by virtue of being descendant keys of a member-dependent key.

Key "X" 314 is the parent key of key "Y" 316. Key "Y" 316 is the parent key of key "Z" 318. Key "Y" 316 and key "Z" 318 are private to the same member to which key "X" 314 is private by virtue of being descendant keys of a member-dependent key.

Each member-dependent key is associated with a unique index value. The index value of a member-dependent key is included in the member-dependent key's key component entry that is contained in the parent key of the member-dependent key. For example, t-node 320 is associated with key "A" 304, which is the parent key of key "B" 306. Because key "A" 304 is the parent key of key "B" 306, t-node 320 includes a key component entry for key "B" 306.

The key component entry for key "B" 306 includes a key component name ("B") 322. The key component entry for key "B" 306 also includes a field is_member_dependent 326. Because key "B" 306 has been created as a member-dependent key, is_member_dependent 326 is set to "1" (e.g., "true"). By is_member_dependent 326 being set to "1", it is signified that the value in offset 324 is not actually an offset to a t-node, but that the value in offset 324 is actually an index value used to locate an entry in table 328. In this example, offset (or index value) 324 is set to "1". Thus, in this example, the unique index value associated with key "B" 306, as a member-dependent key, is "1".

In this example, table 328 includes two entries whose index is set to "1"; index value 330 is set to "1" and index value 336 is set to "1". Both of these index values correspond to offset (or index value) 324, which is also set to "1". Associated (i.e., in the same row) with index value 330 is member identifier 332. Associated with index value 336 is member identifier 336. Each member of the distributed system is associated with a unique member identifier. In this example, a member identifier of a first member is "1" and a member identifier of a second member is "2". In one embodiment, when a member-dependent key is created, a different entry for that member-dependent key is created in the member-dependent key map for each member of the distributed system.

The entry that includes member identifier 332 also includes an offset 334. The entry that includes member identifier 338 also includes an offset 340. In this example, offset 334 is shown as "O(1)" and offset 340 is shown as "O(2)". Each of these offsets provides a location to a different t-node that is associated with key "B" 306. Because member identifier 332 ("1") corresponds to offset 334, a member having a member identifier of "1" uses offset 334 to locate a t-node when that member accesses key "B" 306 (which corresponds to index value "1"). Because member identifier 338 ("2") corresponds to offset 340, a member having a member identifier of "2" uses offset 340 to locate a t-node when that member accesses key "B" 306.

T-nodes 342 and 350 are both associated with key "B" 306. T-node 342 is located at the location indicated by offset 334. T-node 350 is located at the location indicated by offset 340. T-node 342 may include a different value and different key component entries than t-node 350. For example, the value entry for T-node 342 is labeled with 240-1 to indicate that the value associated with key "B" 306 for T-node 342 is associated with member 1, and the value entry for T-node 340 is labeled with 240-2 to indicate that the value associated with key "B" 306 for T-node 350 is associated with member 2. A value may be written to Value 240-1 independently of writing to Value 240-2, and thus, at any point in time Value 240-1 may have a value different from the value of Value 240-2.

Thus, a t-node associated a key relative to one member is different than a t-node associated with the same key relative to another member. Because each t-node that is associated with a single member-dependent key includes its own independent key component entries, once a parent key is created as a member-dependent key, all of that parent key's child keys will be member-private even if not explicitly made member-dependent. The key component entries for one t-node may have the same key component names as the key component entries for another t-node.

For example, t-node 342 includes a key component entry that includes a key component name 344 that is set to "X". Similarly, t-node 350 includes a key component entry that includes a key component name 352 that is also set to "X". However, an offset 346 in the key component entry that is included in t-node 342 is different than an offset 354 that is included in t-node Therefore, offset 346 may provide the location ("O(3)") of a t-node that is associated with key "X" 308, while offset 350 may provide the location ("O(4)") of a t-node that is associated with key "X" 314.

The values for key "X" 308 and key "X" 314 may differ. This is so even though key "X" 308 and key "X" 314 were not specially created as member-dependent keys (as demonstrated by is_member_dependent 348 and is_member_dependent 356 both being set to "0"). For example, key "X" 308 could be created as a child key of key "B" 306 from a member whose member identifier is "1", while key "X" 314 could be created as a child key of key "B" 306 from a member whose member identifier is "2". The different members need not even be aware that key "B" 306 is a member-dependent key.

Thus, data may be member-private even though a key name associated with that data is global. As a result, a program does not need to be modified in order for an instance of that program to create and access data that is private and protected from all other instances of that program. Other programs, such as installation programs, may create member-dependent keys for which child keys may be created at a later time.

FIGS. 4A, 4B, and 4C are block diagrams that illustrate member-dependent data sub-hierarchies, according to one embodiment. The hierarchy illustrated in FIG. 4A may be apparent to a first member of a distributed system. The hierarchy illustrated in FIG. 4B may be apparent to a second member of a distributed system. The hierarchy illustrated in FIG. 4C may be apparent to a third member of a distributed system.

Each of the hierarchies illustrated in FIGS. 4A, 4B, and 4C include a key "CLUSTER_1" 402. In each of these hierarchies, a key "A" 404 is a child key of key "CLUSTER_1" 402. In each of these hierarchies, a key "B" 406 is a child key of key "A" 404. In each of these hierarchies, a key "C" 408 and a key "D" 412 are child keys of key "B" 406. All of the first, second, and third members of the distributed system can see and access these keys.

In each of the hierarchies illustrated in FIGS. 4A, 4B, and 4C, key "C" 408 is a member-dependent key. That is, key "C" 408 was expressly created as a member-dependent key. In this example, no other key in the hierarchies was expressly created as a member-dependent key.

In FIG. 4A, a key "E" 414 is a child key of key "C" 408. Only the first member of the distributed system can see and access key "E" 414 and its corresponding value and child keys (if any). In contrast, in FIG. 4B, a key "F" 416 is a child key of key "C" 408. Only the second member of the distributed system can see and access key "F" 416 and is corresponding value and child keys (if any). In further contrast, in FIG. 4C, key "C" 408 has no apparent child keys. Thus, the third member of the distributed system does not see any child keys of key "C" 408. A given member of a distributed system may be access an entire sub-hierarchy that is private to that member.

Creating a Key

When a new child key is created under a key, a new t-node may be allocated for the child key. A key component entry may be created for the child key. The key component entry may be entered into the t-node of the parent key. If intermediate child keys do not exist, then the intermediate child keys may be created as a side-effect of the creation of the new child key. For example, if a child key named "a.b.c.d" is to be created, and only "a.b" currently exists, then "a.b.c" and "a.b.c.d" are both created. Any of the intermediate child keys could be a member-dependent key.

If an intermediate child key is a member-dependent key, then all of that intermediate child key's descendant keys are member-private. If an intermediate child key is a link to another key, then the t-node address field may point to a t-node for the other key. Thus, in one embodiment, multiple key component entries may share a single t-node.

In one embodiment, to create a new key, user access control information, a key handle of a parent key of the new key, a key name of the new key, and security attributes of the new key are provided to a function. The function finds a part of the provided key name that is not common with the name of the key that is stored in the provided key handle. The function stores that part in the new key. For example, if the key name of the key handle contains "a.b.c", and the provided key name is "a.b.c.d.e", then the part stored in the new key is "d.e".

The function assigns the key handle to a temporary key handle. For each component in the new key, the function does the following. The function finds a t-node that corresponds to the parent key using the temporary key handle. The function finds a t-node that corresponds to the key component. If the t-node that corresponds to the key component already exists, then the function assigns the t-node that corresponds to the key component to the temporary key handle.

If the t-node that corresponds to the key component does not already exist, then the function creates a key component entry in memory for the key component.

The function allocates a new t-node for the key component and inserts the address of the new t-node into the address field of the key component entry. The function may call another function to enter the key component entry into a t-node. The function assigns the handle of the newly created key to the temporary key handle.

After the function has done the above for each component in the new key, the function may call another function to finish "shadow updating" of a list of free registry pages. The function marks the log space as being invalid. The function returns the key handle that is currently stored in the temporary key handle.

Finding a Key Component Entry in a T-Node

In one embodiment, to find a key component entry in a t-node, a key name and a t-node address are provided to a function. The function searches through the slotted page structure of the t-node at the address provided to the function. Using the array in the header of the slotted page structure, the function locates and reads key component entries. If the key name stored in a key component entry matches the key name provided to the function, then the function returns the address of the t-node and the offset of the key component entry that stores the matching key name. The function may also return a size of the key component entry that stores the matching key name.

If the key component entry that stores the key name is a key component entry for a member dependent key, then the address of the t-node may be obtained from the member dependent key map, as described above in the section titled "THE MEMBER-DEPENDENT KEY MAP".

If the function does not find the key name provided to the function in any of the key component entries in the slotted page structure, then the function searches directly addressed registry pages for the key name. If the function finds the key name, then the function returns the address of the t-node and the offset of the key component entry that stores the matching key name. The function may also return a size of the key component entry that stores the matching key name.

If the function does not find the key name provided to the function in any of the directly addressed registry pages, then the function searches indirectly addressed registry pages for the key name. If the key name is found, then the function returns the address of the t-node and the offset of the key component entry that stores the matching key name. The function may also return a size of the key component entry that stores the matching key name.

If the function does not find the key name in the slotted page structure or in the directly or indirectly addressed pages, then the function may return an error message.

Creating a New Key Component Entry in a T-Node

In one embodiment, to create a new key component entry in a t-node, a key component entry and a t-node address are provided to a function. Based on the t-node address, the function finds the registry page in which the key component entry is to be created. If there is not enough space to create the key component entry in the registry page, then another function is called to find a free page.

If there is enough space to create the key component entry in the registry page, then the function does the following. The function writes the t-node (at the address provided) into a log space. The function updates a count of key component entries that are in that t-node. The function sequentially scans through the header of the slotted page structure of the t-node to find the first empty entry. If there are no empty entries in the header, then the function creates a new entry at the end of the array that is in the header.

Once the function has found or created an empty entry, the function writes the key component entry provided to the function at the end of the free space in the slotted page structure. The function inserts size and location information of the new key component entry in a corresponding entry in the array in the header of the slotted page structure. Another function may be called to finish "shadow updating" of a list of free registry pages.

If there is not enough space to create the key component entry in the registry page, then the function does the following. The function initializes a new registry page with the slotted page structure. The function then performs the techniques described above, but in relation to the new registry page.

Whether or not there is enough free space to create the key component entry in the registry page, the log space mentioned above is marked as being invalid. The function returns an indication of success or failure based on whether the new key component entry was created.

Deleting a Key Component Entry from a T-Node

In one embodiment, to delete a key component entry from a t-node, a key name is provided to a function. The function finds a t-node that stores the key component entry that stores the provided key name by calling the function described below to find a t-node in which a key component entry for a key exists. The function decrements a count of key component entries in the t-node found. The function finds the key component entry that stores the provided key name by calling the function described above for finding a key component entry in a t-node. The function makes an entry in a registry page log and writes the t-node's registry page into the registry page log space. The function deletes the key component entry that stores the provided key name from the slotted page structure. Another function may be called to finish "shadow updating" of a list of free registry pages. The function marks the log space as being invalid. The function returns an indication of success or failure based on whether the key component entry was deleted.

Finding a T-Node in which a Key Component Entry for a Key Exists

In one embodiment, to find a t-node in which a key component entry for a key exists, a key name is provided to a function. The function parses the key name to separate the key components of the provided key name. The function reads the root registry page. For each of the key components of the provided key name, the function does the following.

The function finds the key component entry for the key component by calling the function described above in the section titled "FINDING A KEY COMPONENT ENTRY IN A T-NODE" to find a key component entry in a t-node. If the function cannot find the t-node, then the function may return an error. Otherwise, the function reads the t-node that was found.

After doing the above for each of the key components of the provided key name, the function returns the t-node that was most recently read (i.e., the current t-node).

Setting a Value of an Empty T-Node

In one embodiment, to set a value of an empty t-node, a value and a t-node are provided to a function. The function may return an error if the size of the value is greater than a maximum permitted value size. Otherwise, the function scans through a list of free registry pages to find the total size of the available free space. The function may return an error if the size of the free space is less than the size of the value.

Otherwise, the function makes an entry for the operation in the registry page log space. The function writes the t-node into the registry page log space. The function writes the size of the value in a field of the t-node that is reserved for the size of the value. In one embodiment, the function writes the first 256 bytes of the value in the field of the t-node that is reserved for the value. If the size of the value is 256 bytes or less, then the function returns an indication that the operation was successful.

Otherwise, based on the size of the value, the function allocates direct and possibly indirect pages (if the value is sufficiently large) for the value by updating the t-node and the list of free registry pages. The function writes the value in the allocated pages. If any error occurs while writing, then the function may return an error. Otherwise, another function may be called to finish "shadow updating" of the list of free registry pages. The function marks the log space as being invalid. The function returns an indication of success or failure based on whether the value was stored.

Modifying the Value of a T-Node

In one embodiment, to modify a value of a t-node, a new value and a t-node are provided to a function. If the size of the new value exceeds a maximum permitted size, then the function may return an error. Otherwise, the function scans through a list of free registry pages to find a total size of free space available. The function reads the t-node to find the current size of the existing (old) value. If the sum of the total available free space and the current size of the existing value is not greater than the size of the new value, then the function may return an error.

Otherwise, the function makes an entry for the operation in the registry page log space. The function writes the t-node into the registry page log space. The function writes the size of the new value in the field of the t-node that is reserved for the value of the t-node. If the size of the new value is small enough so that one or more registry pages can be freed, then the function writes those one or more registry pages into the registry page log space and modifies the list of free registry pages.

Regardless of whether the function modifies the list of free registry pages, in one embodiment, the function writes the first 256 bytes of the new value in the field reserved for the value in the t-node. If the size of the new value is 256 bytes or less, then the function returns an indication of success. Otherwise, if the size of the new value is greater than the size of the existing value and new registry pages should be acquired to store the new value, then the function calls another function to find a free page. The function writes the new value in the pages allocated.

If any error occurs while writing, then the function may return an error. Otherwise, the function may call another function to finish "shadow updating" of the list of free registry pages. The function marks the log space as being invalid. The function returns an indication of success or failure based on whether the value was stored.

Opening a Key

In one embodiment, to open a key, user access control information and a key name are provided to a function. The function searches for a t-node that stores the key name, possibly by calling another function that is designed to find a t-node. If the key does not exist, or if access to the key is not permitted based on the user access control information, then the function may return an error.

Otherwise, the function inserts a key component entry for the key into a key handle. The function inserts security attributes for the key into the key handle. The function then returns the key handle.

Reading the Value of a Key

In one embodiment, to read the value a key, user access control information, a key handle (such as may be returned by the function for opening a key, as described above), an address of a buffer in which a read value is to be stored, and an address at which a size of the buffer is stored are provided to a function. The function obtains an address of a t-node based on the provided key handle. If the provided size of the buffer is zero, then the function may return an error.

Otherwise, the function reads user security attributes from the provided user access control information. The function reads key security attributes from the provided key handle. The function checks if the user indicated in the user access control information has sufficient privileges to access the key by calling another function. If the check is not successful, then the function may return an error.

Otherwise, the function reads the t-node from a disk into memory. The function reads the size of the value that is stored in the t-node. If the size of the value is greater than the provided size of the buffer, then the function may insert the size of the data at the address where the size of the buffer was stored, and return an error.

Otherwise, in one embodiment, the function reads the first 256 bytes of the value from the field in the t-node that stores the value. The function stores this at the address of the buffer provided. If the size of the value is more than 256 bytes, then the function reads directly addressed pages. The function appends the information read from the directly addressed pages to the data that is stored in the provided buffer. The function does not stop reading the directly addressed pages until the entire value has been read. The function inserts the total number of bytes read at the address where the size of the buffer was stored. The function may return an indication of success.

Creating a Key and Setting the Value of the Key

In one embodiment, to create a new key and set the value of the new key, user access control information, a function may call another function to create a key, such as is described above. However, shadow updating is not finished, and the registry page log is not marked as being invalid. After the key is created, the function may set the value of the new key by calling another function to set the value of a key, such as is described below in the section "SETTING THE VALUE OF A KEY".

Creating a Link

In one embodiment, to create a link, user access control information, a key handle of an open destination key, a key name of a source key, and security attributes of the source key are provided to a function. The function reads a t-node of the destination key using an address that is located in the provided key handle of the destination key. This t-node may be referred to as the destination t-node.

If the number of existing links on the key exceeds some specified threshold, then the function may return an error. If the destination key is a member-dependent key and the source key is not a member-dependent key, or vice-versa, then the function may return an error.

Otherwise, the function creates an image of the destination t-node in the registry page log. The function updates a link count of the destination t-node. The function finds a t-node that corresponds to a parent key of the source key (whose key name was provided). This t-node may be referred to as the source t-node. The function creates, in memory, a key component entry for the provided key name. The function inserts the address of the destination t-node into a t-node address field of the key component entry. The function enters the key component entry into the source t-node. The function deletes log records that were involved in the operation. The function may call another function to finish "shadow updating" if needed. The function returns a key handle.

Creating a Member-Dependent Key

In one embodiment, to create a new member-dependent key, user access control information, a key handle of a parent key of the new key, a key name of the new key, and security attributes of the new key are provided to a function. The function performs the same operations as those described above in the section "CREATING A KEY", except that, by setting a bit in the key component entry for the key stored in the parent t-node, the function creates a new entry for the member-dependent key to be created in the member-dependent key map. The function enters the address of the newly created entry in the member-dependent key map inside the key component entry of the key. The function allocates a t-node for the key for each of the members (one t-node for each member) and writes the addresses of these t-nodes in the entry corresponding to the key in the member-dependent key map.

Setting a Security Attribute of a Key

In one embodiment, to set a security attribute of a key, user access control information, a key handle of an opened key, and new security attributes for the opened key are provided to a function. If the user identified by the user access control information does not have sufficient privileges to access the key, then the function may return an error.

Otherwise, the function reads a t-node that corresponds to the provided key handle. The function creates a record of the t-node in the registry page log. The function updates the t-node in memory and then writes the t-node to the disk. The function marks the registry page log as being invalid.

Setting a Value of a Key

In one embodiment, to set a value of a key, user access control information, a key handle of an opened key, a pointer to a buffer that contains the new value, a type of the new value, and the size of the new value are provided to a function. If the user identified by the user access control information does not have sufficient privileges to access the key, then the function may return an error. If the provided size of the new value is equal to zero, then the function may return an error.

Otherwise, the function retrieves the t-node that corresponds to the provided key handle. The t-node may be a member-dependent key or not; the address of the t-node may be obtained by a previously called function, such as the function described above with reference to opening a key. The function may use another function, such as the function described above in the section "MODIFYING A VALUE OF A T-NODE" to modify the value of the retrieved t-node. If this other function returns an error, then the error is passed along.

Otherwise, the function may mark the registry page log as being invalid and return an indication of success.

Deleting a Value of a Key

In one embodiment, to delete a value of a key, user access control information and a key handle of an opened key are provided to a function. If the key component entry for the key is already empty (e.g., signified by the t-node's address being equal to 0x0000), then the function may return an error.

Otherwise, the function reads the t-node for the key. The function writes, in the registry page log space, the value of each registry page that contains the value of the key. The function creates a shadow of a list of free registry pages, possibly by calling another function designed to create such a shadow. The function updates the shadow by marking every registry page that contains the value of the key as being a free registry page. The function writes t-node for the key into the registry page log space. The function updates the t-node by making the value field of the t-node empty, making the value size of the t-node zero, and marking direct and indirect addresses in the t-node as being empty.

If the key is a member-dependent key, then the function does the following. The function creates a shadow of the member-dependent key map, possibly by calling another function designed to create a shadow of the member-dependent key map. The function deletes an entry, in the shadow of the member-dependent key map, which corresponds to the t-node.

Regardless of whether the key is a member-dependent key, the function may call another function to finish "shadow updating" of data structures. The function marks the log space as being invalid.

Deleting a Key

In one embodiment, to delete a key, user access control information and a key handle of an opened key are provided to a function. If the key component entry for the key is already empty (e.g., signified by the t-node's address being equal to 0x0000), or if the key has child keys, then the function may return an error.

Otherwise, the function reads a t-node from a disk by using the address of the t-node that is stored in the key component entry that is stored in the provided key handle. If the value size for the key is not equal to zero, then the function may return an error. If the count of the total number of key component entries is not equal to zero, then the function may return an error.

If the function does not return an error, then the function does the following. The function locates, on the disk, a registry page that contains the key component entry for the key. The function reads the located registry page into memory. The function writes the registry page into the registry log space, possibly by calling another function that writes to the registry log space. The function deletes the key component entry in the registry page that is stored in memory by calling another function, such as the function described above in the section titled "DELETING A KEY COMPONENT ENTRY FROM A T-NODE". The function may call another function to finish "shadow updating" of data structures. The function marks the log space as being invalid. The function may return an indication of success.

Converting a Normal Key to a Member-Dependent Key

A key handle of an opened key is provided to a function. If the opened key is already a member-dependent key, then an error may be thrown. Otherwise, the function locates the t-node for the key and the key component entry (KCE) corresponding to the key (The KCE is located in the parent t-node of the key). The function sets a bit in the KCE to indicate that it is a member-dependent key. The function then makes as many replicas of the t-node for the key as there are members in the distributed system. The function creates a new entry for the key in the member-dependent key map and inserts the index of this entry in the key component entry corresponding to the key. The function inserts the addresses of the t-nodes into the entry for the key in the member-dependent key map. The member number indexes each t-node address.

Converting a Member Dependent Key to a Normal Key

A key handle of an opened member-dependent key is passed to a function. If any of the ancestors of the key is also a member-dependent key, then an error may be thrown. The function locates the key component entry for the key. The function then locates the member-dependent key map entry for the key (the index of the member-dependent key map entry for the key is read from the key component entry for the key). The function then locates the t-nodes for the key corresponding to the members of the distributed system (there are as many t-nodes for a member-dependent key as there are members of the distributed system). The function deletes the t-nodes and all the descendants of each corresponding to all the members of the distributed system except the current member. The function then marks the bit in the key component entry for the key to indicate that the key is a normal key. The function inserts the address of the t-node for the key corresponding to the current member of the distributed system in the key component entry for the key.

Creating Member Private Data in a Global Namespace

Figure 5:
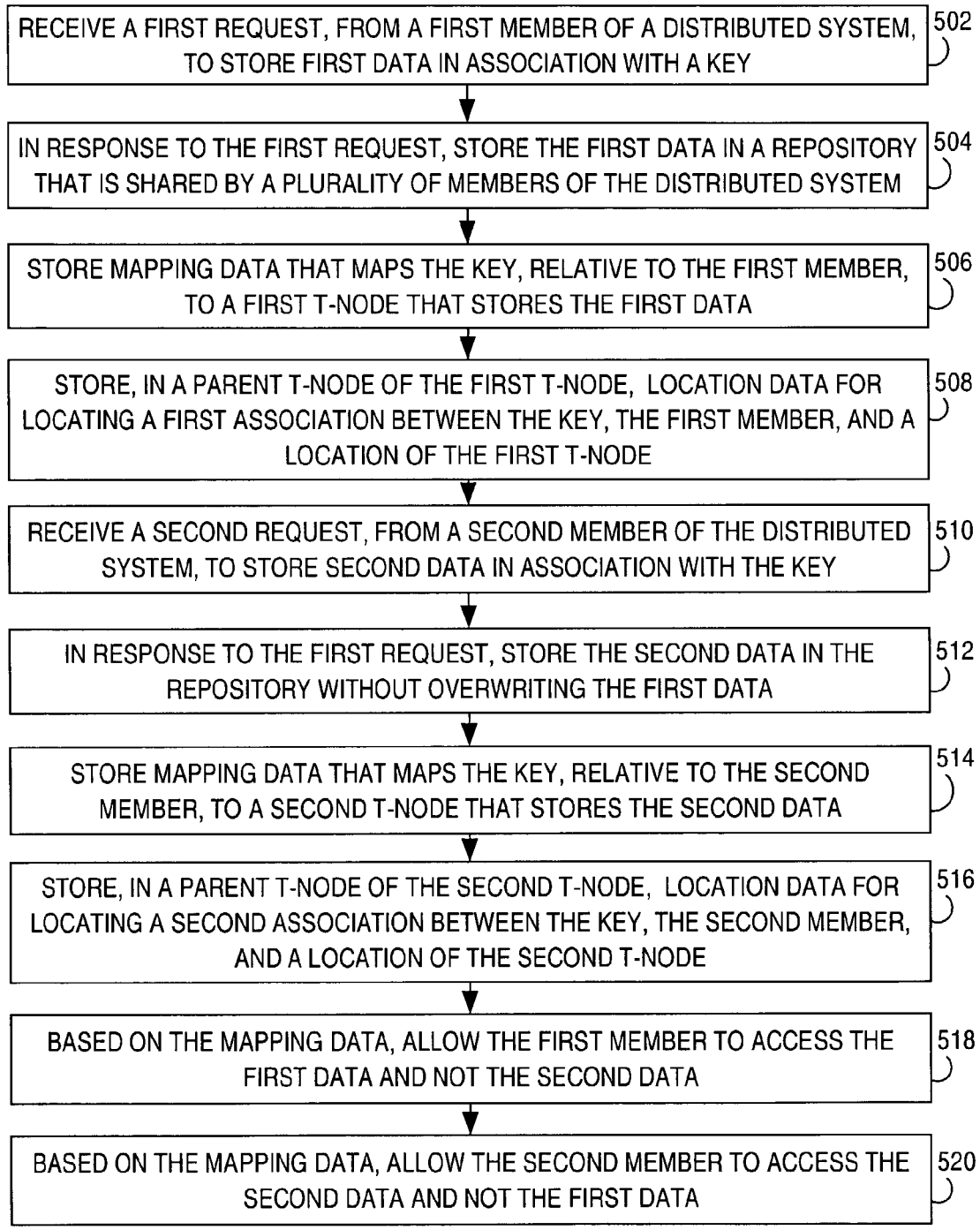
FIG. 5 is a flow diagram that illustrates a technique for creating member private data in a global namespace, according to one embodiment.

FIG. 5 is a flow diagram that illustrates a technique for creating member private data in a global namespace, according to one embodiment. In block 502, a first request is received from a first member of a distributed system to store first data in association with a key.

In block 504, in response to the first request, the first data is stored in a repository that is shared by a plurality of members of the distributed system. The repository may store configuration information that is used by both a first instance of a computer program that runs as a first member of the distributed system and a second instance of the computer program that runs as a second member of the distributed system. The repository may store configuration information that is used by multiple instances of a computer program that run on a same hardware element of a distributed system.

In block 506, mapping data is stored. The mapping data maps the key, relative to the first member, to a first t-node that stores the first data. The mapping data may be stored in a member-dependent key map. The mapping data may include a first association between the key, the first member, and first location information. The first location information provides a location of the first t-node. In block 508, location data for locating the first association within the member-dependent key map is stored in a parent t-node of the first t-node.

In block 510, a second request is received from a second member of a distributed system to store second data in association with the key. The second data may differ from the first data. In block 512, in response to the second request, the second data is stored in the repository without overwriting the first data.

In block 514, mapping data is stored. The mapping data maps the key, relative to the second member, to a second t-node that stores the second data. The mapping data may include a second association between the key, the second member, and second location information that differs from the first location information. The second location information provides a location of the second t-node. In block 516, location data for locating the second association within the member-dependent key map is stored in a parent t-node of the second t-node.

In block 518, based on the mapping data, the first member is allowed to access the first data and not the second data. In block 520, based on the mapping data, the second member is allowed to access the second data and not the first data. Thus, the first data is member private data that is private to the first member, and the second data is member private data that is private to the second member. Member private data may be a single value. Member private data may be a complete subtree of key-value pairs.

Hardware Overview

Figure 6:
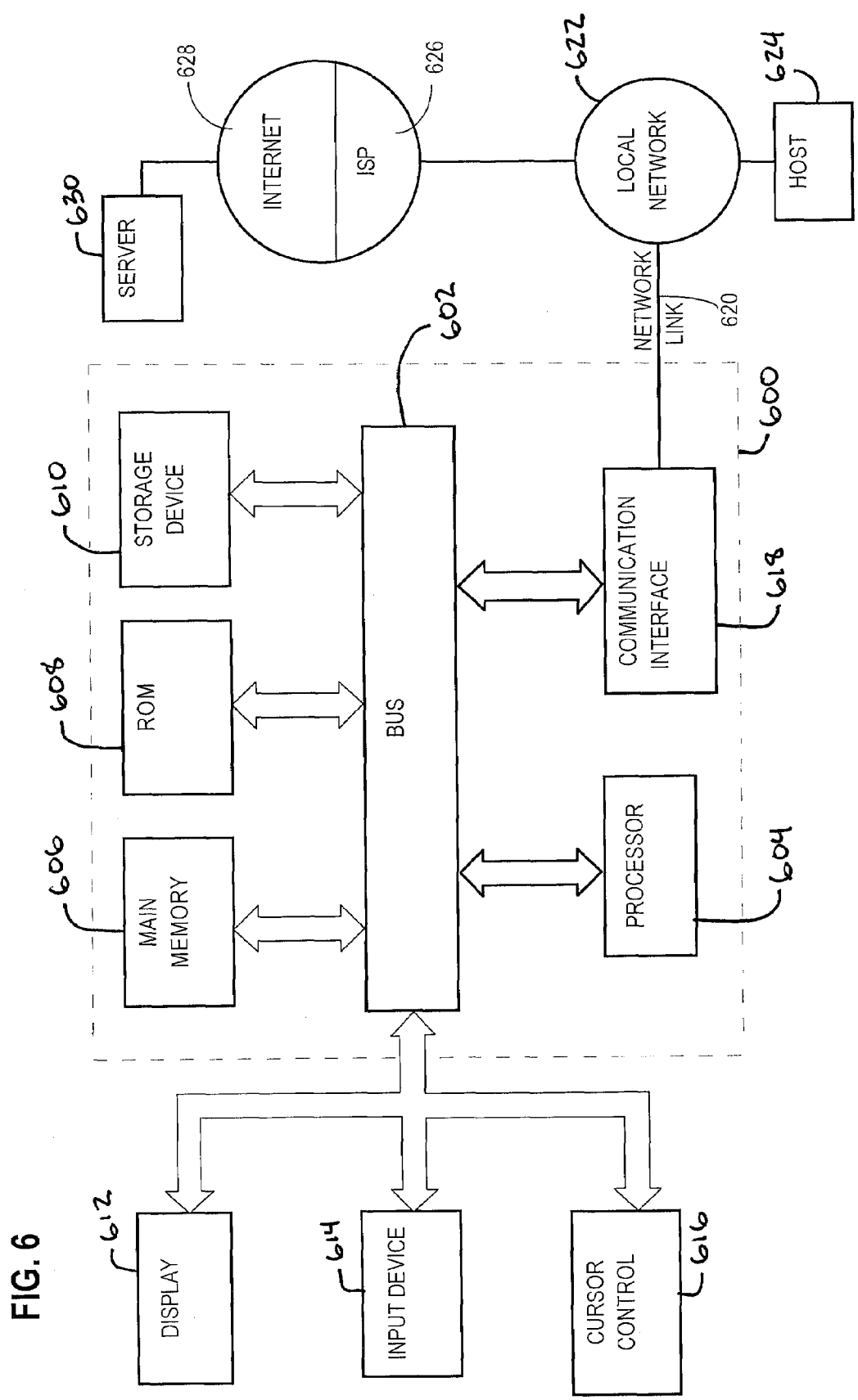
FIG. 6 is a block diagram that illustrates a computer system 600 upon which an embodiment of the invention may be implemented.

FIG. 6 is a block diagram that illustrates a computer system 600 upon which an embodiment of the invention may be implemented. Computer system 600 includes a bus 602 or other communication mechanism for communicating information, and a processor 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The invention is related to the use of computer system 600 for implementing the techniques described herein. According to one embodiment of the invention, those techniques are performed by computer system 600 in response to processor 604 executing one or more sequences of one or more instructions contained in main memory 606. Such instructions may be read into main memory 606 from another computer-readable medium, such as storage device 610. Execution of the sequences of instructions contained in main memory 606 causes processor 604 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, or any other memory chip or cartridge.

Various forms of computer readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line. Appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. In any such implementation, communication interface 618 sends and receives digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both carry digital data streams.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for creating member private data in a global namespace, the method comprising:
    a computer processor storing, in a repository shared by a plurality of members of a distributed system, first data that is associated with a key that is specified in a namespace;
    after storing said first data, said computer processor storing, in said repository, second data that is associated with said key;
    said computer processor storing, on a volatile or non-volatile computer-readable storage medium, mapping data that: (a) maps said key to a first member of the distributed system and to a first data structure that stores said first data, thereby forming a first association between said key, said first member, and said first data, and (b) maps said key to a second member of the distributed system and to a second data structure that stores said second data, thereby forming a second association between said key, said second member, and said second data;
    after storing said second data associated with said key, said computer processor receiving from the first member a request for the value of said key and sending said first data to said first member due at least in part to an existence of said first association;
    said computer processor, in response to said request from said second member, sending said second data to said second member due at least in part to an existence of said second association; and
    said computer processor, based on said mapping data, preventing first member from accessing said second data and preventing second member from accessing said first data;
    wherein said first member is separate from said second member; and
    wherein said first data differs from said second data.

2. The method of claim 1, further comprising:
    receiving a first request to store said first data in association with said key;
    receiving a second request to store said second data in association with said key;
    wherein said first request is received from said first member;
    wherein said second request is received from said second member;
    wherein said storing of said first data is performed in response to receiving said first request; and
    wherein said storing of said second data is performed in response to receiving said second request.

3. The method of claim 1, wherein storing said mapping data comprises:
    storing, in a third data structure, a first association between said key, said first member, and first location data; and
    storing, in said third data structure, a second association between said key, said second member, and second location data that differs from said first location data.

4. The method of claim 3, wherein:
    said first location data is for locating said first data structure; and
    said second location data is for locating said second data structure.

5. The method of claim 3, further comprising:
    storing, in a parent data structure of said first and second data structures, location data for locating said first association within said third data structure; and
    storing, in said parent data structure, location data for locating said second association within said third data structure.

6. The method of claim 1, further comprising:
    receiving a request to create a member-dependent key; and
    in response to said request to create a member-dependent key, creating said key.

7. The method of claim 1, further comprising:
    receiving a request from said first member to delete said key; and
    in response to said request from said first member to delete said key, modifying a data structure to cause said key to be deleted relative to said first member but not said second member.

8. The method of claim 1, further comprising:
    receiving a request from said first member to read said key; and
    in response to said request from said first member to read said key, returning said first data to said first member but not returning said second data to said first member.

9. The method of claim 1, further comprising:
receiving a request from said first member to set a value of said key; and
in response to said request from said first member to set a value of said key, modifying said first data but not said second data.

10. The method of claim 1, further comprising:
receiving a request from said first member to convert said key into a key that is not a member-dependent key; and
in response to said request to convert said key into a key that is not a member-dependent key, causing a key component entry to point to said first data instead of said mapping data.

11. The method of claim 1, further comprising:
receiving a request from said first member to convert a key that is not a member-dependent key into a member-dependent key; and
in response to said request to convert a key that is not a member-dependent key into a member-dependent key, replicating a data structure that stores data that is associated with said key that is not a member-dependent key.

12. A volatile or non-volatile computer-readable storage medium that carries instructions to be executed by a processor for creating member private data in a global namespace, the instructions comprising instructions for performing the steps of:
storing, by a computer processor, in a repository shared by a plurality of members of a distributed system, first data that is associated with a key that is specified in a namespace;
after storing said first data, storing, in said repository, second data that is associated with said key;
storing, on a volatile or non-volatile computer-readable medium, mapping data that: (a) maps said key to a first member of the distributed system and to a first data structure that stores said first data, thereby forming a first association between said key, said first member, and said first data, and (b) maps said key to a second member of the distributed system and to a second data structure that stores said second data, thereby forming a second association between said key, said second member, and said second data;
after storing said second data associated with said key, receiving from the first member a request for the value of said key and sending said first data to said first member due at least in part to an existence of said first association;
response to said request from said second member, sending said second data to said second member due at least in part to an existence of said second association; and
based on said mapping data, preventing said first member from accessing said second data, and preventing said second member from accessing said first data;
wherein said first member is separate from said second member; and
wherein said first data differs from said second data.

13. The volatile or non-volatile computer-readable storage medium of claim 12, wherein the instructions comprise instructions for performing the steps of:
receiving a first request to store said first data in association with said key;
receiving a second request to store said second data in association with said key;
wherein said first request is received from said first member;
wherein said second request is received from said second member;
wherein said storing of said first data is performed in response to receiving said first request; and
wherein said storing of said second data is performed in response to receiving said second request.

14. The volatile or non-volatile computer-readable storage medium of claim 12, wherein storing said mapping data comprises:
storing, in a third data structure, a first association between said key, said first member, and first location data; and
storing, in said third data structure, a second association between said key, said second member, and second location data that differs from said first location data.

15. The volatile or non-volatile computer-readable storage medium of claim 12, wherein:
said first location data is for locating said first data structure; and
said second location data is for locating said second data structure.

16. The volatile or non-volatile computer-readable storage medium of claim 12, wherein the instructions comprise instructions for performing the steps of:
storing, in a parent data structure of said first and second data structures, location data for locating said first association within said third data structure; and
storing, in said parent data structure, location data for locating said second association within said third data structure.

17. The volatile or non-volatile computer-readable storage medium of claim 12, wherein the instructions comprise instructions for performing the steps of:
receiving a request to create a member-dependent key; and
in response to said request to create a member-dependent key, creating said key.

18. The volatile or non-volatile computer-readable storage medium of claim 12, wherein the instructions comprise instructions for performing the steps of:
receiving a request from said first member to delete said key; and
in response to said request from said first member to delete said key, modifying a data structure to cause said key to be deleted relative to said first member but not said second member.

19. The volatile or non-volatile computer-readable storage medium of claim 13, wherein the instructions comprise instructions for performing the steps of:
receiving a request from said first member to read said key; and
in response to said request from said first member to read said key, returning said first data to said first member but not returning said second data to said first member.

20. The volatile or non-volatile computer-readable storage medium of claim 12, wherein the instructions comprise instructions for performing the steps of:
receiving a request from said first member to set a value of said key; and
in response to said request from said first member to set a value of said key, modifying said first data but not said second data.

21. The volatile or non-volatile computer-readable storage medium of claim 12, wherein the instructions comprise instructions for performing the steps of:
receiving a request from said first member to convert said key into a key that is not a member-dependent key; and
in response to said request to convert said key into a key that is not a member-dependent key, causing a key component entry to point to said first data instead of said mapping data.

22. The volatile or non-volatile computer-readable storage medium of claim 12, wherein the instructions comprise instructions for performing the steps of:

receiving a request from said first member to convert a key that is not a member-dependent key into a member-dependent key; and in response to said request to convert a key that is not a member-dependent key into a member-dependent key, replicating a data structure that stores data that is associated with said key that is not a member-dependent key.

* * * * *

UNITED STATES PATENT AND TRADEMARK OFFICE
CERTIFICATE OF CORRECTION

PATENT NO. : 7,672,945 B1
APPLICATION NO. : 10/304449
DATED : March 2, 2010
INVENTOR(S) : Surojit Chatterjee et al.

It is certified that error appears in the above-identified patent and that said Letters Patent is hereby corrected as shown below:

On Page 2, in column 1, under "Other Publications", line 17, delete "VLDM" and insert -- VLDB --, therefor.

On Sheet 6 of 7, in fig 5, box 512, line 1, delete "FIRST" and insert -- SECOND --, therefor.

In column 3, line 37, delete "data." and insert -- data; --, therefor.

In column 24, line 44, in claim 19, delete "claim 13," and insert -- claim 12, --, therefor.

Signed and Sealed this

Twenty-eighth Day of September, 2010

David J. Kappos
*Director of the United States Patent and Trademark Office*